United States Patent [19]

Farnsworth et al.

[11] Patent Number: 5,012,463
[45] Date of Patent: Apr. 30, 1991

[54] OPTICAL READ/WRITE STORAGE SYSTEM FOR FLEXIBLE MEDIA HAVING BERNOULLI STABILIZATION AT THE OPTICAL HEAD

[75] Inventors: Stephen W. Farnsworth, Berthoud; David R. Dodds, Bolder; Slobodan R. Perera, Boulder; K. John Stahl, Boulder, all of Colo.

[73] Assignee: Bernoulli Optical Systems Company, Boulder, Colo.

[21] Appl. No.: 167,652

[22] Filed: Mar. 14, 1988

[51] Int. Cl.$^5$ ................................................ G11B 7/00
[52] U.S. Cl. ............................................. 369/100
[58] Field of Search .................... 369/100, 44–46, 369/111; 350/255; 360/99.01, 99.04, 102

[56] References Cited

U S. PATENT DOCUMENTS

| | | | |
|---|---|---|---|
| 3,861,786 | 1/1975 | Badgett | 350/255 |
| 3,927,252 | 12/1975 | Polley | |
| 3,992,576 | 11/1976 | Sugiwa | 360/103 X |
| 4,003,059 | 1/1977 | Sugiwa et al. | 350/255 X |
| 4,030,815 | 6/1977 | Andreuski et al. | 350/255 |
| 4,032,927 | 6/1977 | Goshima | 350/255 X |
| 4,071,854 | 1/1978 | Bijon et al. | 369/111 |
| 4,074,330 | 2/1978 | Norton et al. | 360/102 |
| 4,153,341 | 5/1979 | Kawamura et al. | 350/255 |
| 4,414,592 | 11/1983 | Losee et al. | 360/99.01 X |
| 4,507,774 | 3/1985 | Marchant | 369/271 |
| 4,704,712 | 11/1987 | Siryj | 369/255 X |
| 4,794,480 | 12/1988 | Jones et al. | 360/99.04 |

FOREIGN PATENT DOCUMENTS

| | | | |
|---|---|---|---|
| 58-194148 | 11/1983 | Japan | 369/DIG. 1 |
| 60-32168 | 2/1985 | Japan | 369/DIG. 1 |
| 62-204456 | 9/1987 | Japan | 369/DIG. 1 |
| 1382371 | 1/1975 | United Kingdom | |
| 1441024 | 6/1976 | United Kingdom | |
| 1442132 | 7/1976 | United Kingdom | |
| 1490223 | 10/1977 | United Kingdom | |
| 1539086 | 1/1979 | United Kingdom | |
| 1561537 | 2/1980 | United Kingdom | |
| 1569667 | 6/1980 | United Kingdom | |
| 2065953 | 7/1981 | United Kingdom | |
| 0146656 | 7/1985 | United Kingdom | |
| 0191567 | 8/1986 | United Kingdom | |

OTHER PUBLICATIONS

Rosch, "Worm's for Mass Storage", PC Magazine, vol. 6, No. 12 (Jun. 23, 1987) pp. 135–166.
Y. Fukui, et al., "New Servo Method with Eccentricity Correction Circuit", Optical Engineering, vol. 26, No. 11, (Nov. 1987) pp. 1140–1145.
Olympus Corporation, Lake Success, New York, Product Literature for TAOHS ACTUATORS (date unknown).
Olympus Corporation, Lake Success, New York, Product Literature for TAOHS OPTICAL HEAD ASSEBMLIES (date unknown).
Pentax Technologies, Broomfield, Colorado, Optical Head Product Specifications for VU-108-02, Write-once Optical Disk Head, Preliminary Specification, May, 1987.
Revision E pp. 1–8.

*Primary Examiner*—Donald McElheny, Jr.
*Attorney, Agent, or Firm*—Woodcock, Washburn, Kurtz, Mackiewicz & Norris

[57] ABSTRACT

An optical read/write storage system for reading and writing data to and from a flexible optical media is shown to include an optical read/write head for providing focused light onto the flexible media and for receiving reflected light from the flexible media and a fine movement stabilizater, connected to the optical head and positioned proximate the flexible media, for stabilizing the flexible media in a desired position so that the optical head need not be moved substantially toward or away from the media in order to maintain the light focused on the media.

1 Claim, 6 Drawing Sheets

OPTICAL READ/WRITE STORAGE SYSTEM FOR FLEXIBLE MEDIA HAVING BERNOULLI STABILIZATION AT THE OPTICAL HEAD

FIELD OF THE INVENTION

The present invention relates to the field of optical information storage systems and, more particularly, to optical information storage systems which are capable of access speeds comparable to magnetic type storage systems.

BACKGROUND OF THE INVENTION

The present emphasis in the development of information storage systems is the capability to store more and more information into a so-called "desk top" sized computer memory system. Those "desk top" sized memory systems which incorporate magnetically recorded hard disc media, such as that used in Winchester disc drive type memory systems, currently have the capacity to store upwards of 20 megabytes of magnetically recorded information. The problem with such memory systems is that by necessity the hard disc media is permanently mounted into the computer. Since the media is not easily removable, the user is limited to whatever portion of the hard disc is remaining for information storage at the time of use. Accordingly, magnetically recorded hard disc media information storage systems are not viewed as a potential solution to increasing information storage capacity.

So-called "floppy" disc memory systems wherein flexible discs, each having a diameter of either 5.25 inches or 3.50 inches, are used as the storage media provides easily removable storage media. However, the problem with such storage systems is that the present storage capacity of information magnetically recorded on a single floppy disc used in such a system has not yet reached a level equal to that of the hard disc, i.e. a single floppy disc media can only store approximately 1 to 2 megabytes of magnetically recorded information.

Systems for storing information which can be accessed through optical devices have received significant attention due to their potential capacity to store substantially more data, i.e. on the order of 400 to 800 megabytes of information, than that available in either magnetically recorded hard disc or floppy disc storage systems. Additionally, the media for use in such optical systems can be of a form similar to that of a so-called floppy disc, that is a media which is easily removable. Unfortunately, major problems continue to plague the development and commercial acceptance of such optical systems, namely the relative slowness by which information can be retrieved compared to magnetic storage systems and the current size restrictions of so-called "desk top" computers.

Consider first the current size restrictions. So-called "desk top" computers have been provided with a number of modular components, particularly including information storage systems, which can be added into the casing of the computer to provide a certain degree of customizing to fit a particular need. Since such components can have any one of a number of sizes, the American National Standards Institute has adopted certain external standard dimensions with regard to such components, which standards are generally referred to as full-height and half-height standards. Since the half-height standard appears to be the most desirable for such modular components, a need exists to develop an optical information storage system which will fit into the halfheight standard. The half-height standard for modular components is as follows: height 1.625 inches; width 5.75 inches; and depth 8.00 inches. The problem with current optical storage systems is that present designs and techniques require components which when assembled easily exceed this size standard. It appear that only a few of the currently available systems include an optical head assemblies, which is only one component of an optical storage system, which would fit into such a size standard.

Consider now the relative slowness by which information can be retrieved in current optical information systems compared to magnetic storage systems. The primary factor contributing to the slow access problem of present optical storage systems is the weight of the optical head assembly. As will be appreciated, the greater the weight of a device for reading from or writing to an optical disc, the more difficult and consequently slower it will be to orient such a device in relation to precise locations on a rotating disc.

Present optical storage systems include those found in video disc or compact disc (CD) players, which are of the read only variety and those which are termed write once read many times (WORM) optical storage systems. Presently the ability to write and read many times to and from an optical disc is primarily limited by the media available for use in such systems. The invention described herein does not address research to provide an optical media which is capable of having information written and erased many times. Nor is the present invention to be limited only to media which currently exists.

In present CD systems an optical disc is rotated about a central axis. A laser beam is projected onto the surface of the disc by means of a lens, a reflecting mirror or beamsplitter, and a projection lens. The laser beam is modulated by the information stored on the optical disc and the modulated light is detected by a photodetector. Output signals from the photodetector are provided to a processor for producing information signals and tracking signals. The source of the laser beam, the lens, the mirror, the projection lens and the detector are collectively referred to as a optical head assembly. The optical head assembly is typically moved radially across the rotating disc in order to access the information stored on the disc.

Since the information to be read or written on an optical disc is contained in narrow tracks, coarse and fine radial movement mechanisms are provided. Until the present invention, it has not been possible, or even considered desirable, to combine coarse and fine movements into one mechanism. The coarse radial movement mechanism typically includes either a pivoting arm or a radially oriented track which moves the optical head assembly radially across many tracks. The fine radial movement mechanism generally operates to move the projection lens either along a radial axis, which causes the projection lens to move between a few adjoining tracks, or along an axis generally perpendicular to the disc, which allows the projection lens to dynamically focus the laser beam on the surface of the disc during operation. Such fine movement mechanisms can be found in the commercially available optical head assemblies sold by the Olympus Corporation of Lake Success, N.Y. (TAOHS Series) or Pentax Teknologies of Broomfield, Colo. (VU-108-02 Series). An example of such an optical head assembly can also be found in U.S. Pat. No. 4,092,529—Aihara et al. The height of these fine movement mechanisms also contributes to the size restriction problem. Reference is also made to the WORM optical storage system shown in Rosch, Winn L., "WORM's for Mass Storage" PC Magazine, Vol. 6, No. 12 (June 23, 1987) pages 135-148.

Since the fine movement mechanism typically causes movement of the projection lens through the use of relatively massive electro-magnets, the overall weight of the optical head assembly is such that movement of the assembly is cumbersome and thus relatively slow. In an attempt to resolve the access time problem, efforts to reduce the optical head assembly have been reported. However, since the fine movement mechanism is still an essential component, the weight and size contributed by such a mechanism remains. For example, Fukui, Y. et al., "New servo method with eccentricity correction circuit" Optical Engineering, Vol. 26, No. 11 (November, 1987) pages 1140-1145 discloses an optical head assembly which describes the combination of an anamorphic prism, a convex lens and a roof shaped prism in an effort to determine data and tracking information signals from a single light beam. Such a combination appears to result in fewer optical components, however, the size and weight of the fine movement mechanism remains.

SUMMARY OF THE INVENTION

It is an object of the invention to provide an optical information storage system which is capable of either reading from or writing onto optical media at speeds comparable to magnetic storage systems.

It is a further object of the invention to provide an optical information storage system having an optical head assembly of minimum weight.

It is another object of the invention to provide an optical storage system which is of a size meeting the half-height standard.

It is still another object of the invention to provide an optical information storage system which eliminates the need for a dynamic focusing mechanism by precisely stabilizing a flexible optical media during Read/Write operations, said stabilization being provided on a primary and secondary level, both of which involve the suspension of said media on an air-bearing created by means of the Bernoulli principle.

These and other objects of the invention are achieved in an optical read/write storage system for reading and writing data to and from a flexible optical media is shown to include an optical read/write head for providing focused light onto the flexible media and for receiving reflected light from the flexible media and a fine movement stabilizer, connected to the optical head and positioned proximate the flexible media, for stabilizing the flexible media in a desired position so that the optical head need not be moved substantially toward or away from the media in order to maintain the light focused on the media.

These and other objects and advantages of the invention will become more apparent from the following detailed description when taken in conjunction with the following drawings.

DETAILED DESCRIPTION OF THE PREFERRED EMBODIMENT

Figure 1:
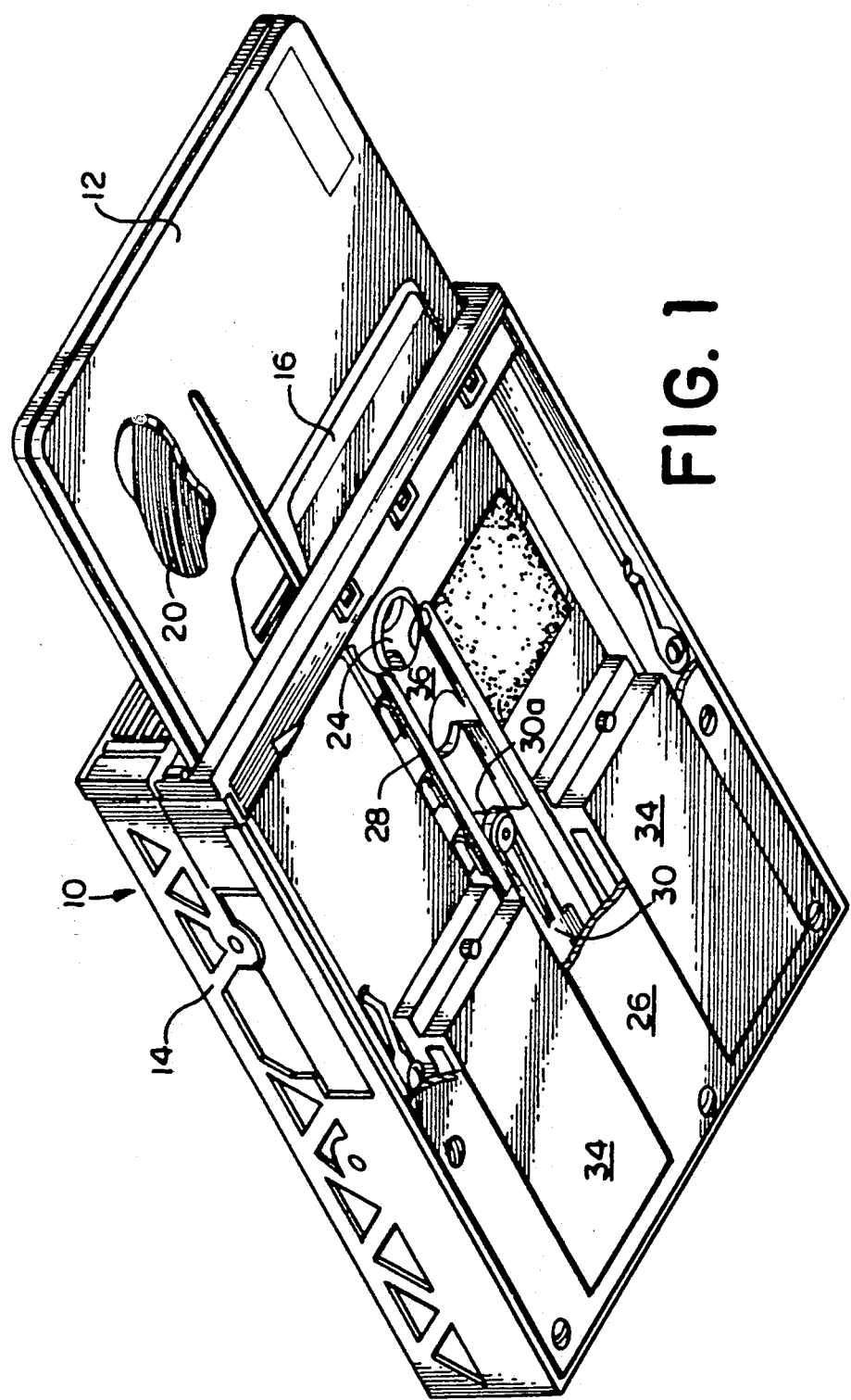
FIG. 1 is a perspective view of an optical information storage system in accordance with the principles of the present invention.

A new and novel optical information storage system constructed in accordance with the principles of the present invention is shown in FIG. 1 and generally designated 10. A cartridge 12 is shown to be partially inserted in disc drive housing 14 such that slidable cover 16 has begun to move laterally. When such lateral movement is completed, an opening 18 (shown in FIGS. 2-4) will be exposed allowing operation upon flexible optical media disc 20.

A central hub 22 is provided in disc 20 for engagement by drive spindle 24 when cartridge 12 is fully inserted into housing 14 for rotation of disc 20. The bottom cover 26 of housing 14 is shown as being partially cut away in order to expose spicule member 28 which serves to guide cartridge 12 during insertion and arm 30 during access of disc 20. Although not shown in complete detail in FIG. 1, an optical head assembly 32 is mounted at the distal end of arm 30. A linear actuator motor 34 serves to move arm 30 in spicule member 28 so that optical head assembly 32 is moved radially across the surface of disc 20. While several types of linear actuator motors are available for use with the invention, it is preferred that the linear actuator motor chosen be capable of providing both coarse and fine movements of arm 30 for both track-seeking and track-following by optical head assembly 32. The range of movement of arm 30 is from the retracted position shown in FIG. 1 to an extended position such that the distal end of arm 30 strikes stop 36.

The details of construction of cartridge 12, specifically its integrally formed Bernoulli surface, and its insertion and engagement by the various disc drive components described above is more fully detailed in several pending U.S. Pat. applications, namely, Disk Drive Motor Mount—McCurtrey et al., filed Apr. 21, 1986 having Ser. No. 854,342; Disk To Spindle Engaging Device—Jones et al., filed Apr. 21, 1986 having Ser. No. 854,333; Disc Drive with Spicule Member Jones et al., filed Apr. 21, 1986 having Ser. No. 854,419; Bernoulli Plate in Cartridge—Jones, filed Apr. 21, 1986 having Ser. No. 854,130; Plural Magnetic Disc Assembly—Jones, filed Apr. 21, 1986 having Ser. No. 854,292; and Wipers For Pair of Stabilized Magnetic Discs—Freeman, et al., filed Feb. 27, 1987 having Ser. No. 019,872, which applications are incorporated herein by reference. Also incorporated by reference is patent application Disk Cartridge—Bauck, et al., filed Dec. 20, 1986 having Ser. No. 947,632 which application is related to U.S. Pat. No. 4,658,318 for Magnetic Disk Cartridge—Bauck issued Apr. 1, 1986. Since those applications are primarily concerned with magnetically recorded information storage systems, the media (the applications disclose the use of dual floppy discs in a single cartridge) and the means for reading and writing data from or to the media will be different. Otherwise, the structure used in those devices will be substantially identical to that which can be incorporated in an optical storage system in accordance with the present invention. It is assumed that one can substitute a single optical disc for the dual media shown in those applications.

A commercially available disc drive/cartridge for magnetically recording information, which can be modified to provide an optical information storage system in accordance with the present invention, is the Beta-20 System manufactured and sold by IOMEGA Corporation of Roy, Utah, USA. It will be understood that the circuitry and programming, utilized in the Beta-20 System to convert the analog signals generated by magnetically recorded information, to a digital signal, will require modification so that the analog signals generated by optically recorded information can also be converted into a digital signal. The technology for converting such optically generated analog signals to digital signals is known.

Figure 2:
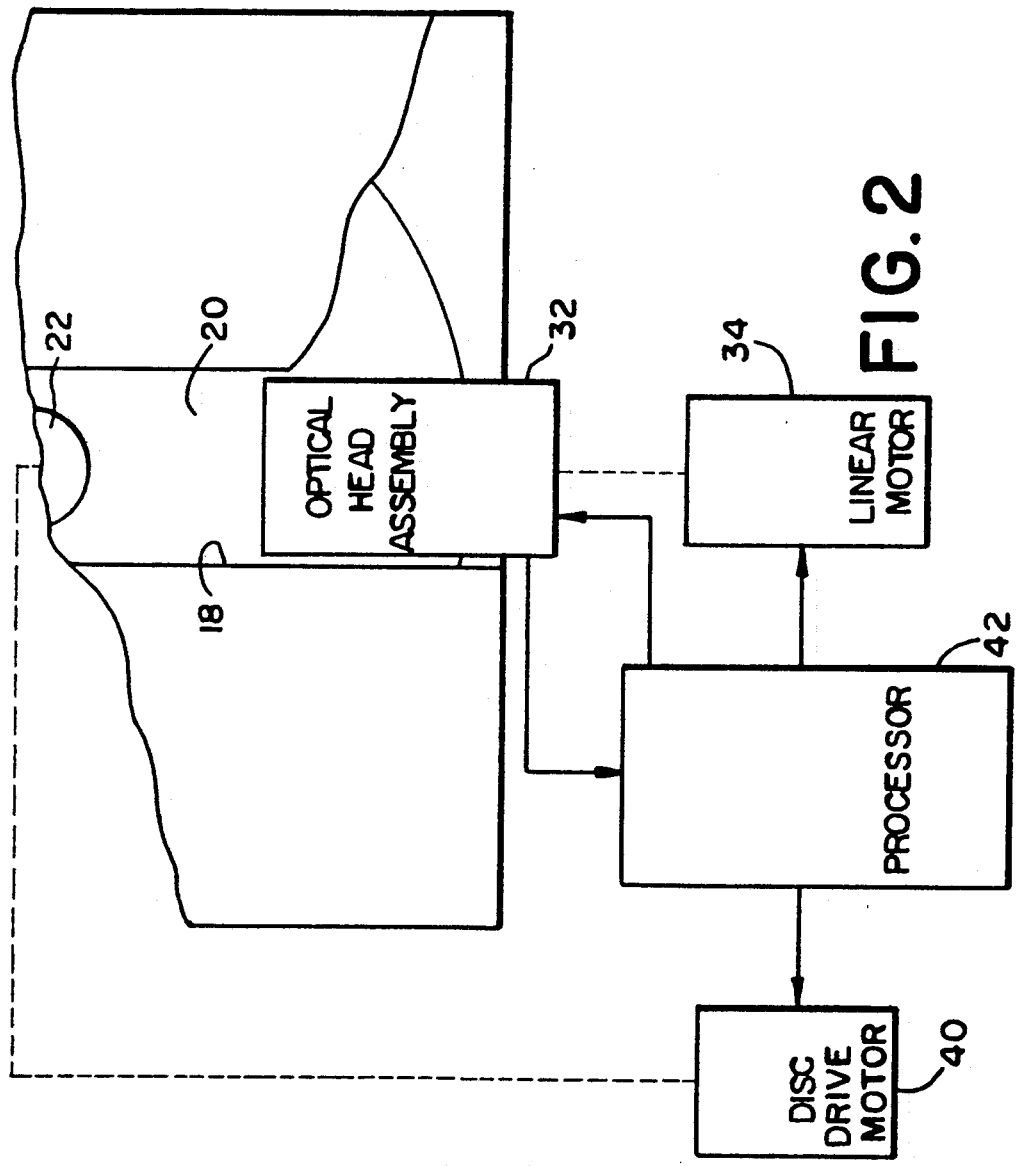
FIG. 2 is a diagrammatic view of the present invention.

Consider now the optical information storage system shown diagrammatically in FIG. 2. Disc drive motor 40 causes disc 20 to rotate. Such rotation is initiated by an appropriate enabling signal from processor 42. As disc 20 is rotating, processor 42 provides an enabling signal to linear motor 34 causing optical head assembly 32 to move radially across the surface of disc 20. Optical head assembly 32 illuminates a limited area on disc 20 with a beam of light, in a manner to be described hereinafter, in response to a further enabling signal from processor 42. Information stored on disc 20 modulates the light reflected off or from the surface of disc 20. This reflected light is detected and converted into an electrical signal by optical head assembly 32 and it is this electrical signal which is provided to process 42. There are several known methods for achieving this operation and the present invention is not limited to the use of any particular method. Similarly, the present invention is not limited to the use of any particular method for storing information on disc 20. That is, processor 42 causes disc 20 to spin, causes linear motor 34 to move optical head assembly 32 radially across disc 20 and causes head assembly 32 to write desired information onto the surface of disc 20.

Figure 3:
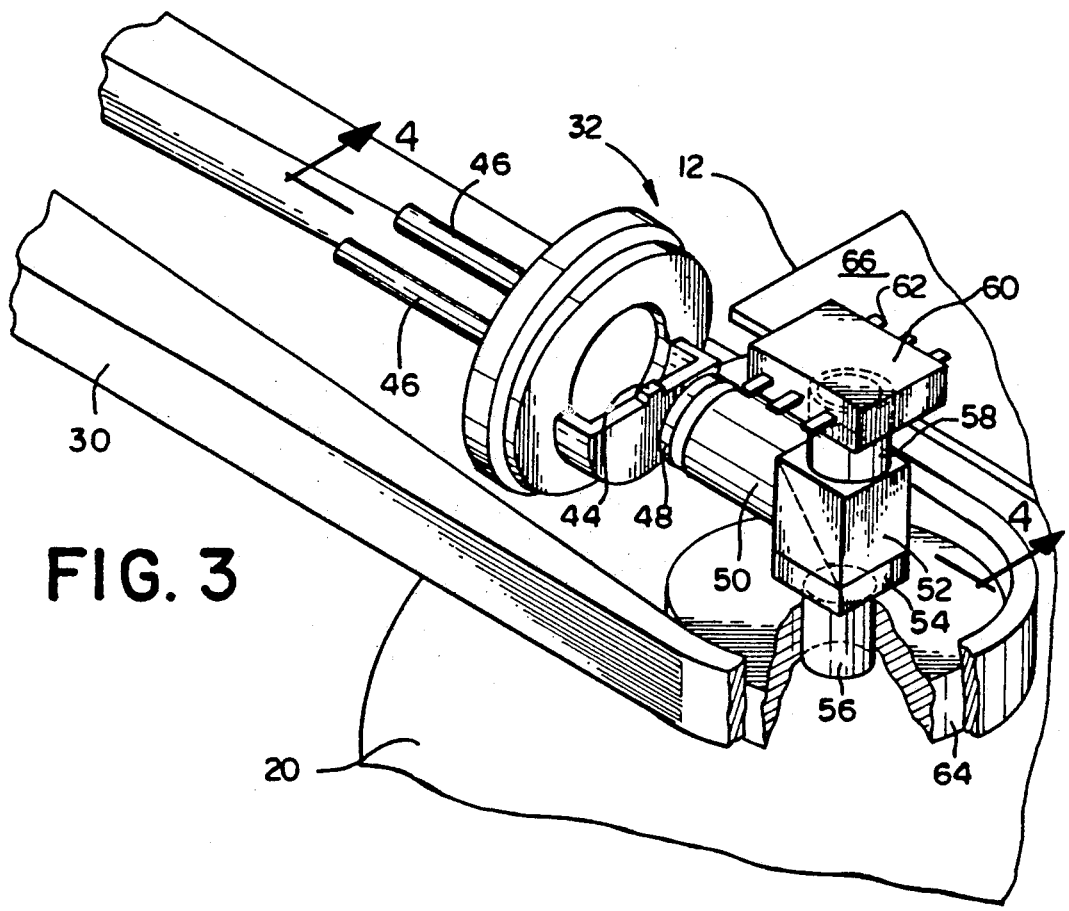
FIG. 3 is a perspective view of a portion of the optical information system shown in FIG. 1.

As shown in FIG. 3, cartridge 12 has been fully inserted and arm 30 has been extended such that the optical head assembly 32 has been moved radially across the surface of disc 20. Optical head assembly 32 is shown to include laser diode 44 having leads 46. Although not shown it will be understood that leads 46 are electrically connected to processor 42 for operation in any one of several known ways. Laser diode 44 serves as a source of light for optical head assembly 32. As used herein the term light is meant to include both visible and invisible light. More particularly, the term light is meant to include that light having a wavelength in the range from 200 to 2000 nanometers (nm).

Figure 4:
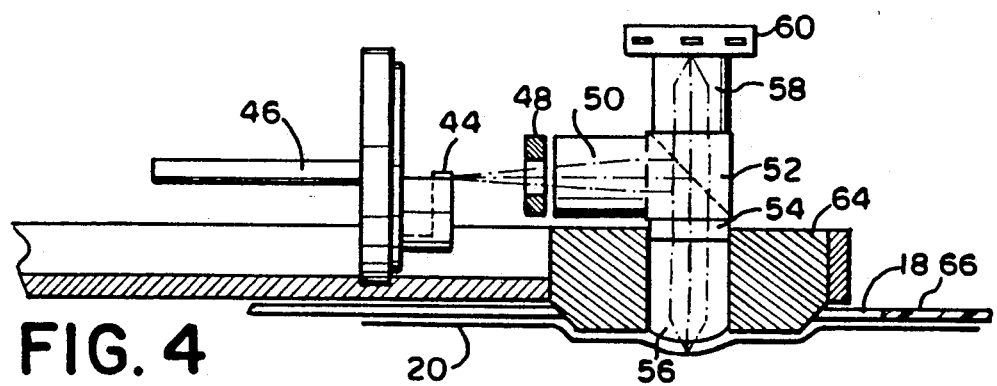
FIG. 4 is a section view along the line 4—4 of FIG. 3.
Figure 6:
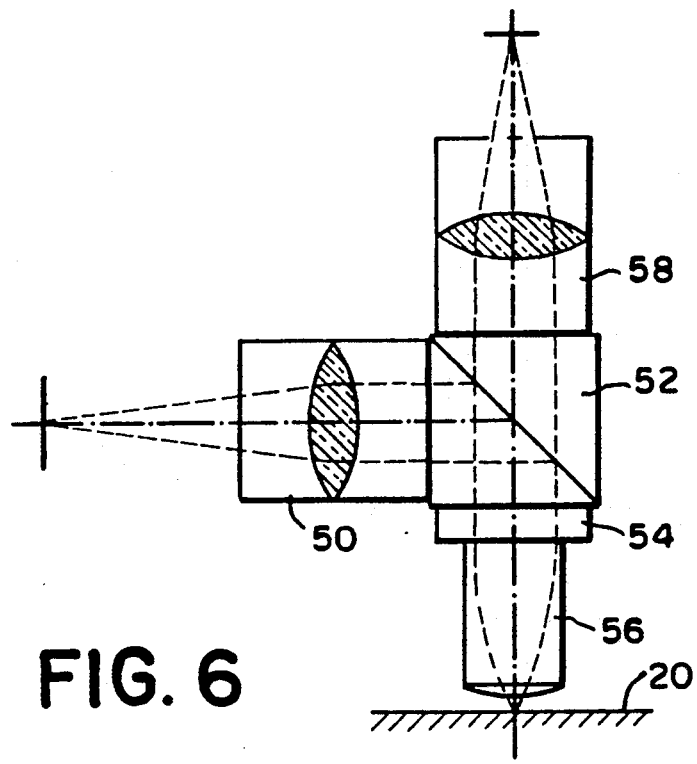
FIG. 6 is a diagrammatic view of the optical components shown in FIG. 3.

As shown in FIGS. 3, 4 and 6, the light emitted from laser diode 44 is passed through an aperature plate 48 which serves to limit the diameter of or to collimate the beam to a desired dimension, which in the preferred embodiment is equal to the smallest allowable beam diameter in the optical system. Light passing through aperature plate 48 is further collimated by lens 50 and provided to polarizing beamsplitter 52 where it is reflected towards, or in the direction of disc 20. In the preferred embodiment, lens 50 is a gradient index lens. The light which is reflected by polarizing beamsplitter 52 is than passed through quarter wave plate 54 which operates, as is known, so as to change the plane of polarization of the light. After reflection, light passing back through quarter wave plate 54 will have had its polarization plane retarded by 90° and thus will pass through the mirror surface contained in beamsplitter 52 will and not be reflected back onto diode 44.

Light passing through quarter-wave plate 54 towards disc 20 will next pass through lens 56, whereupon the light is focused onto the surface of disc 20. Unlike previous optical storage systems, lens 56 is not mounted in a fashion to be moved relative to arm 30. In this regard lens 56 is stationary in relation to arm 30. Light reflected off or from the surface of disc 20 is than collimated by lens 56 and passed again through quarter-wave plate 54. As previously described, since the plane of polarization of the light is now retarded by 90°, it will pass through beamsplitter 52 and be focused by lens 58 onto detector 60. In the preferred embodiment, lenses 56 and 58 are gradient index lenses.

While detector 60 can be of several different types, one detector used is the model IT338 manufactured and sold by Sony Corporation. Such a detector serves to detect, i.e., discern both data as well as tracking information. Detector 60 in turn generates electrical signals which are reflective of the detected data and tracking information. These signals are then transmitted along leads 62 to processor 42. Consequently, the signals from detector 60 not only serve to provide the accessed information, but also allow processor 42 to evaluate the tracking information and provide or supply the appropriate signals to linear motor 34 for moving arm 30 in a manner so that optical head 32 can be radially positioned over and follow a desired track on disc 20. Lens 56 is shown in FIG. 4 to be securely mounted in coupler 64 which in turn is securely mounted in arm 30.

While not shown it will be understood that an opaque cover member may be provided over optical head assembly 32 in order to block out stray light as well a to protect optical head assembly 32 from the surrounding environment.

Lens 56 is capable of stationary mounting in arm 30 due to the elimination by the present invention of the need to dynamically focus the light emitted from diode 44. The need to dynamically focus this light has been eliminated as a result of the degree of stabilization provided to disc 20 and the predictability of the distance between disc 20 and lens 56 during operation. Such stabilization and predictability comes from two sources, namely from plate 66 provided in the preferred embodiment in cartridge 12 and from coupler 64. Plate 66 provides a first stabilization while coupler 64 affords a second stabilization of the media. The surface of plate 66 which faces disc 20 is a Bernoulli surface which serves to create and maintain an air bearing between the disc and plate 66. The structural features which result in the creation of this air bearing by the Bernoulli surface are known and will not be repeated herein. However the adoption of such phenomena to optical information storage systems in order to eliminate the need for dynamically focusing light onto the disc is not known. As used herein, the term "air bearing" signifies the phenomenon of Bernoulli stabilization, wherein the optical media is attracted toward a Bernoulli surface and stabilized.

Although disc 20 has been stabilized by the air bearing created by plate 66, it will be recalled that optical head assembly 32 is accessing disc 20 through opening 18. Opening 18 is also present in plate 66. In the region within opening 18 there is no stabilization of disc 20. Consequently, coupler 64 serves to provide local a second stabilization in the area surrounding lens 56 by creating and maintaining an air bearing which serves to hold that portion of disc 20 passing beneath coupler 64 in a close and, as will be described, predictable relationship thereto. Although the details of the structure contained in coupler 6 for achieving the creation of an air bearing have been described in U.S. Pat. No. 4,414,592—Losee et al., which is incorporated herein by reference, the adoption of such phenomena to optical information storage systems in order to eliminate the need for dynamically focusing light onto the disc is not known.

Figure 5:
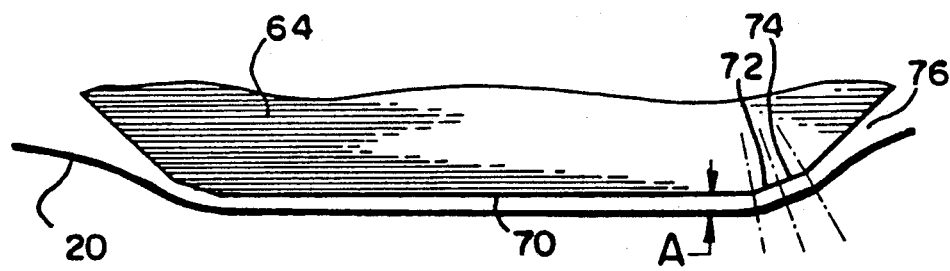
FIG. 5 is an enlarged view of a portion of the coupler shown in FIG. 3.

Referring to FIG. 5, the surface of coupler 64 creates and maintains an air bearing between coupler 64 and disc 20. In the preferred embodiment the distance "A" between coupler and disc is approximately 1 micron plus or minus 0.20 microns. This relationship between coupler 64 and disc 20 is achieved by providing a substantially flat surface 70 surrounding lens 56 (not shown) and a series of increasingly steeper surfaces adjoining surface 70. It will be noted that in FIG. 5 that such surfaces may not be easily distinguished and a certain degree of exaggeration of the arcuate shaped surfaces is necessary. In the preferred embodiment surface 72 is an arcuate surface formed as having an arc radius of approximatelt 500 mm, surface 74 is also an arcuate surface having an arc radius of approximately 270 mm and surface 76 is a generally flat conically shaped surface formed at an angle of approximately 45° with surface 70. It will also be noted that the particular arc radii chosen for surfaces 72 and 74 will vary depending on the properties of the media chosen such as stiffness, toughness, and presence and characteristics of lubrication. The arc radius of lens 56 (not shown in FIG. 5) and the distance it protrudes from surface 70 are also dependent on the properties of the media chosen. In the preferred embodiment the arc radius of lens 56 is approximately 50 mm and it protrudes approximately 0.02 mm from surface 70.

It is important to note that the structure of coupler 64 could be used to stabilize either rotating flexible discs, such as disc 20, or tape forms of optical media. This structure is necessary only to achieve and maintain the Bernoulli stabilization between the optical head contained in coupler 64 and the media that is either being rotated or moved linearly past coupler 64 or which is being helically scanned by a rotating drum, in geometries known in magnetic data recording technology. Furthermore, it may not be necessary to provide plate 66 for Bernoulli stabilization of a rotating disc. Indeed, such stabilization is not necessary for tape media. Therefore the present invention is applicable to both flexible optical discs and tape.

Figure 7:
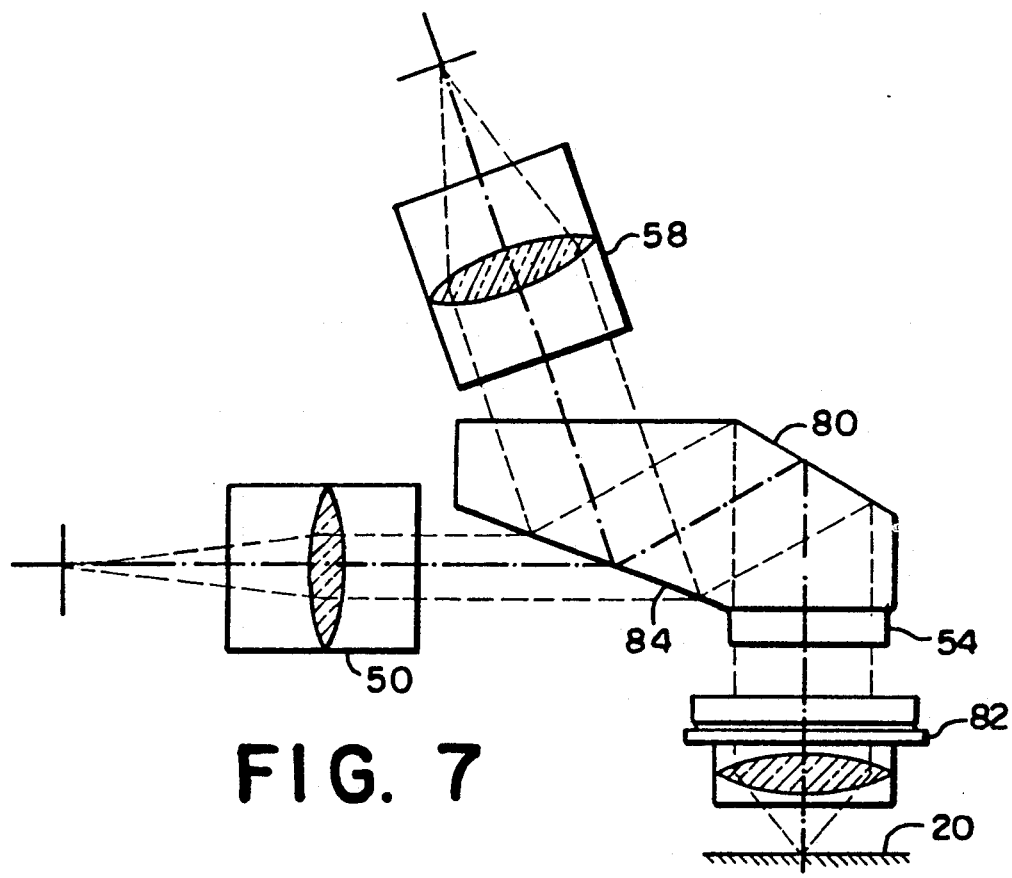
FIG. 7 is a side view of an alternate embodiment of the optical components shown in FIG. 6.

Referring to FIG. 7, there is shown an alternate embodiment of the optical head assembly shown in FIG. 6. Light passing through lens 50 is provided to prism 80 which is a combination anamorphic correction and polarizing beamsplitter prism. In order to reduce the size of the optical head assembly, it was found that a certain amount of anamorphic correction was necessary to the light emitted from diode 44 not shown. The shape of prism 80 is chosen to make the first optical axis perpendicular to the last optical axis. Also an objective lens 82 is substituted for the gradient index lens 56 shown in FIG. 6. It has been found that the objective lens provides better wavefront aberration correction than the gradient index lens. A polarizing beamsplitter coating 84 is provided to reflect light to lens 58. This light then has a plane of polarization which has been retarded by quarter-wave plate 54.

Figure 8:
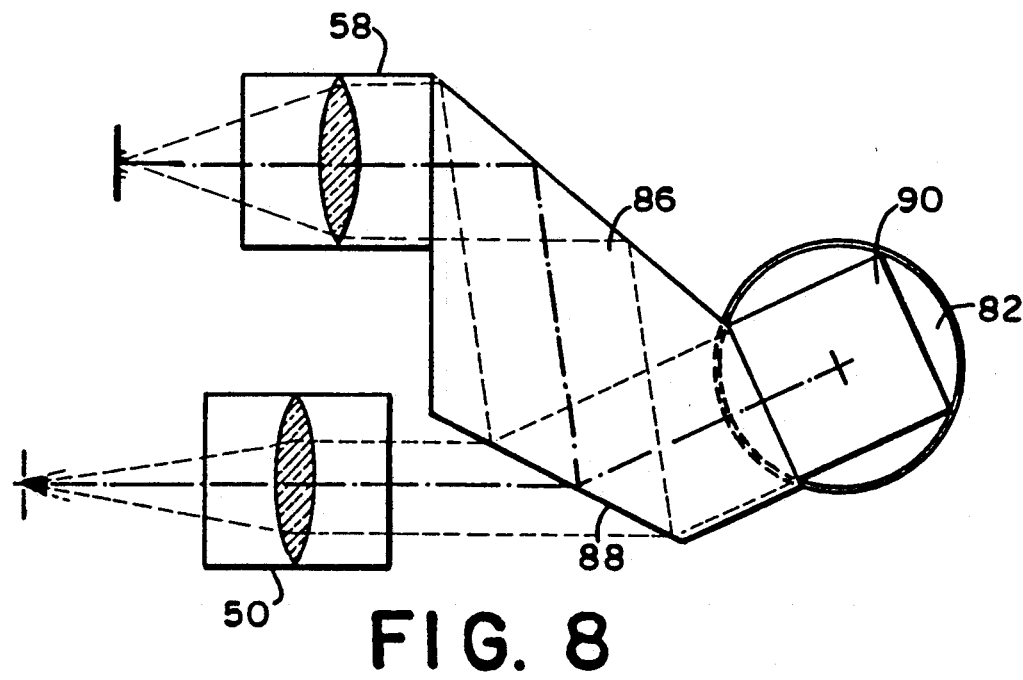
FIG. 8 is a top view of another alternate embodiment of the optical components shown in FIG. 6.

Referring to FIG. 8, there is shown from a top view another alternate embodiment of the optical head assembly shown in FIG. 6. In a similar fashion to the assembly shown in FIG. 7 an objective lens 82 is provided for focusing the light onto media 20 (not shown). A prism 86 is provided whereby lens 58 and lens 50 can now be positioned next to one another, further reducing the optical head assembly height. A polarizing-beamsplitter coating 88 is again provided to reflect light into lens 58. A mirror surface 90 acts as a fold mirror to totally reflect light either from prism 86 to lens 82 or from lens 82 to prism 86.

Figure 9:
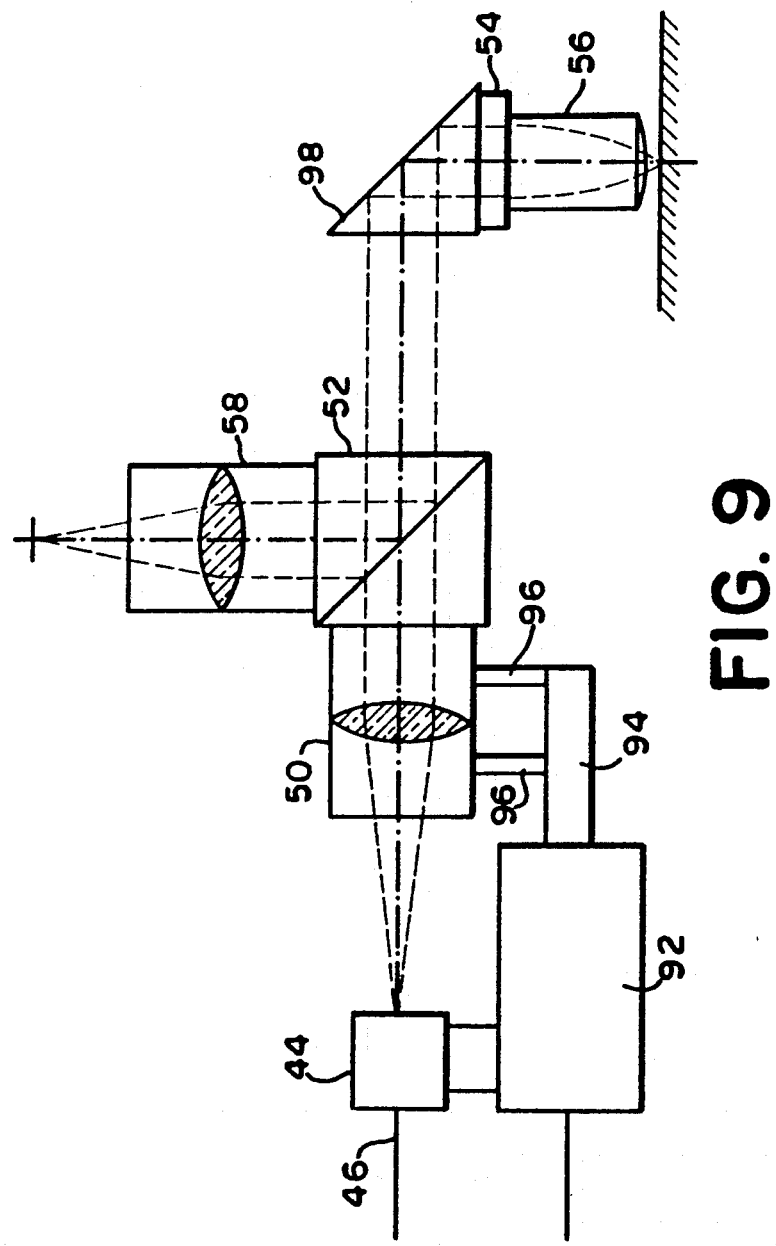
FIG. 9, is side view of another alternate embodiment of the optical components shown in FIG. 6.

Referring to FIG. 9, there is shown another alternate embodiment of the optical head assembly shown in FIG. 6. There may be conditions during which it will be desireable to provide a focusing action. To this end laser diode 44 is securely mounted to a solenoid-like device 92. Lens 50 and beamsplitter 52, however, are mounted or installed on plunger 94, and secured by strut members 96. Device 92 is designed so that the distance between lens 50 and diode 44 can be selectively changed through the application of an appropriate signal on line 98 by processor 42. Such a signal would be provided in response to processor 42 determining from the signal provided by detector 60, the need for focusing the light. Methods for making such determinations are presently known in relation to dynamically focused optical systems. Light emmitted from beamsplitter 52 is than reflected by a prism having mirrored surface 98 through quarter-wave plate 54 and lens 56, onto the surface of disc 20.

While the invention has been described and illustrated with reference to specific embodiments, those skilled in the art will recognize that modification and variations may be made without departing from the principles of the invention as described herein above and set forth in the following claims.

We claim:

1. An optical read/write storage system for reading and writing data to and from flexible optical media, comprising:

optical means for providing focused light onto said flexible media and for receiving reflected light from said flexible media;

first Bernoulli stabilization means, positioned proximate said flexible media, for providing primary Bernoulli stabilization of said flexible media while reading and writing data, said first stabilization means having an opening providing access to said flexible media; and second Bernoulli stabilization means, connected to said optical means and positioned proximate said flexible media, for providing fine Bernoulli stabilization of said flexible media in the immediate region surrounding said optical means so that said optical means need not be moved substantially toward or away from said media in order to maintain said light focused on said media, said second Bernoulli stabilization means comprising a body member having an aperture through which said focused light is directed, said body member having a first flat surface around said aperture, said first flat surface lying in a plane generally parallel to said flexible media, and said body member having a second surface extending away from said first surface outside of said plane so that Bernoulli stabilization of said flexible media in the area of said first surface is created when said media is moving relative to said first surface.

* * * * *